United States Patent

[11] 3,588,744

| | | |
|---|---|---|
| [72] | Inventor | **Hilmer I. Swanson** Quincy, Ill. |
| [21] | Appl. No. | **871,541** |
| [22] | Filed | **Nov. 7, 1969** |
| [45] | Patented | **June 28, 1971** |
| [73] | Assignee | **Gates Radio Company** Quincy, Ill. **Continuation of application Ser. No. 526,611, Feb. 10, 1966.** |

[54] AMPLITUDE COMPENSATED PULSE DURATION MODULATOR
4 Claims, 3 Drawing Figs.

[52] U.S. Cl. .......... 332/9, 328/53, 328/164, 328/168

[51] Int. Cl. .......... H03k 7/00, H03b 1/00

[50] Field of Search .......... 307/264, 268; 328/162, 164; 329/105, 106, 107, 109, 180, 206; 332/1, 9, 15, 16, 60, 64

[56] References Cited

UNITED STATES PATENTS

| | | | |
|---|---|---|---|
| 2,053,449 | 9/1936 | Travis | 329/180X |
| 2,508,672 | 5/1950 | Guanella et al. | 332/1 |

*Primary Examiner*—Roy Lake
*Assistant Examiner*—Lawrence J. Dahl

ABSTRACT: An amplitude compensated pulse duration modulator including a pulse duration modulation system having means for compensating for the effect of stray capacitance at the amplification stages by means of amplitude modulating the pulse duration modulated signal. The amplitude modulated pulse modulated signal is applied to the grid of an amplifier means and the operation of the amplifier means is established such that the amplifier is driven into saturation for all pulses except comparatively smaller area pulses of the pulse train. Accordingly, the pulse train retains a modulation effect only for the smaller area pulses thereby allowing the amplitude modulation to compensate for the reactance effect of the amplifier on the smaller pulses only.

Patented June 28, 1971 3,588,744

INVENTOR.
Hilmer I. Swanson

BY Hill, Sherman, Meroni, Gross & Simpson
ATTORNEYS

AMPLITUDE COMPENSATED PULSE DURATION MODULATOR

This is a continuation of Ser. No. 526,611, filed Feb. 10, 1966.

This invention relates to a pulse duration modulation system and in particular to a modulation system having a compensating means for cancelling the distortion effects introduced at high power amplification stages.

Pulse duration modulation involves converting an informal signal into discrete pulses of varying duration to reflect the information content. For instance, a larger information signal will result in a wider pulse, while a smaller information signal will result in a narrower pulse. It is apparent, therefore, that if the information content is to be recovered from the pulse modulated signal, the established width of the various discrete pulses must be retained through intervening amplification stages prior to demodulation.

It may be necessary to appreciably increase the level of the discrete pulses which represent the information signal. When this occurs, however, it has been found that distortion results, especially at higher amplification levels, causing the various pulses to lose their preestablished size relationships. Since the information signal is generally recovered by integrating the pulse train, it is apparent that the amplified information signal will be distorted to the extent that the discrete pulses lose their proper size relationship.

At high amplification levels considerable voltage differences are experienced between the plate and cathode of an amplifier tube. The result is that stray capacitance between the plate and cathode causes distortion of smaller pulse signals which is appreciable in comparison to the pulse size. To a certain extent the stray capacitance from plate to cathode of a high powered amplifier tube will distort all sudden changes in current through the tube. However, for larger pulses the distortion is insignificant in comparison to the total pulse area which is the measure of the information signal. For smaller pulse signals, however, the amount of distortion introduced by the stray capacitance significantly reduces the effectiveness of pulse modulation for low level signals. Therefore, the stray capacitance is a decisive limitation on the pulse modulation system when high powered amplification is required.

Accordingly, it is a principal object of this invention to provide a pulse duration modulation system having an improved modulation efficiency.

It is also an object of this invention to provide a pulse duration modulation system having a compensating means for substantially cancelling the effect of stray capacitance at the amplification stages thereof.

It is another object of this invention to provide an amplitude modulated, pulse modulator system wherein the amplitude modulation of the information pulse train is provided to compensate for reactive effects inherent in the amplification stages of the system.

It is also an object of this invention to provide a pulse duration modulation system having an amplitude modulation means for reducing the level of narrow modulation pulses such that the increase in pulse area due to stray capacitance at the amplification stages restores the proper information content to the pulse train.

It is a further object of this invention to provide an amplitude modulation means for a pulse duration modulator for modulating an information pulse train according to the information signal and for driving an amplification device into saturation for larger pulse amplitudes and for maintaining the amplification device selectively below saturation for lower pulse amplitudes wherein the lower amplitudes alone retain the effect of the amplitude modulation for being ultimately restored to their proper information levels due to the stray capacitance inherent in the amplification stages.

It is a further object of this invention to provide a pulse modulation system having a low pass filter connected in series with a piate circuit of am amplifier device for carrying a pulse modulation train and for amplitude modulating the pulse train according to the information content thereof for predistorting the narrow pulse signals to cancel the distortion effects of stray capacitance at the higher amplification stages.

These and other objects, features and advantages of the present invention will be understood in greater detail from the following description and the associated drawings wherein reference numerals are utilized in designating an illustrative embodiment and wherein.

Figure 1:
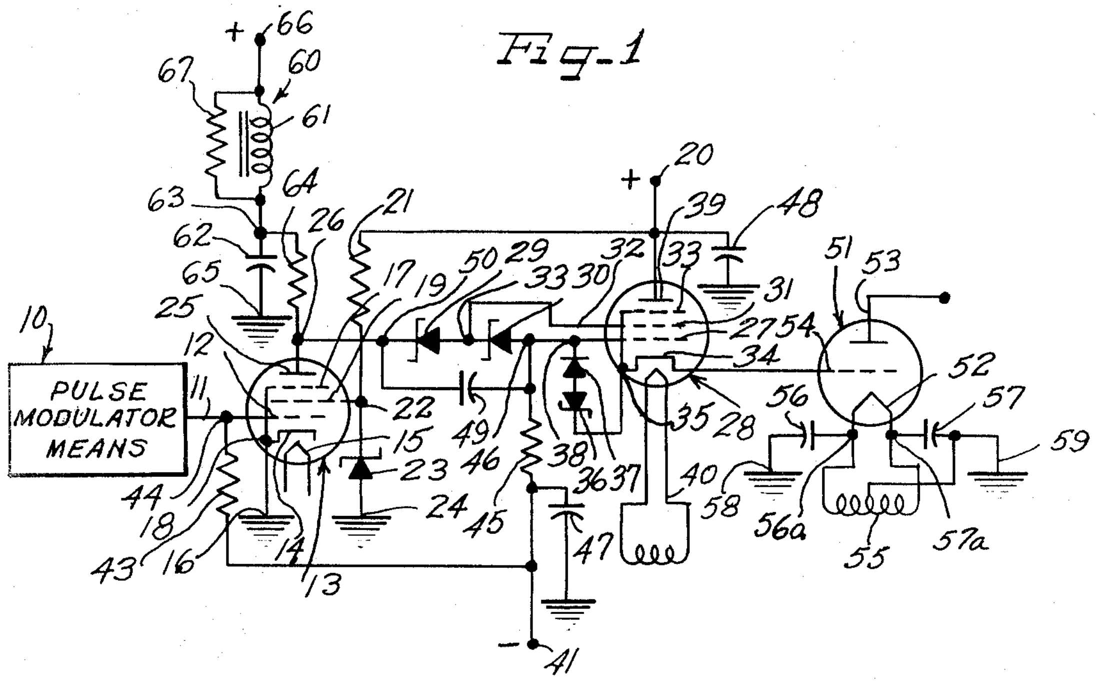
FIG. 1 is a schematic illustration of a pulse modulator and amplitude modulation circuit of this invention.

This invention concerns generally a means for reducing the level of certain pulses of a pulse modulation train wherein the level of those particular pulses will be subsequently increased due to the inherent stray capacitance of high powered amplification devices. An illustrative embodiment of the circuit means used to accomplish the selective pulse amplitude reduction is shown in FIG. 1.

A pulse modulator means is indicated generally by the reference numeral 10 and may include a trigger circuit or the like for triggering a DC power source into an on and off state according to the specific level of the information signal being pulse modulated. The output of the pulse modulation means is applied to a line 11 and consists of a pulse train having uniform amplitude and having varying widths according to the amplitude of the information signal.

The pulse modulated signal received at the line 11 is applied to the grid 12 of an amplifier tube 13. The tube 13 has a cathode 14 and an associated heater 15. The cathode 14 is grounded as at the point 16. Also, the tube 13 has a suppressor grid 17 attached directly to the cathode at a point 18 as is well understood.

In addition, the tube 13 has a screen grid 19 which is energized from a power source connected at the point 20 through a resistor 21 to the junction point 22. A Zener diode 23 is connected between the point 22 and ground potential at a point 24 for maintaining a preestablished voltage level at the grid 19.

The amplifier tube 13 has a plate 25, and the output of the tube is connected from a junction point 26 at the plate 25 to a grid 27 of a further amplification device 28. The connection to the grid 27 is through first and second Zener diodes 29 and 30 which are used to establish predetermined bias voltages for the various grids of the tube 28. In particular, the diodes 29 and 30 both determine the bias voltage for the grid 27 of the tube 28, and in addition a screen grid 31 of the tube 28 is connected through a line 32 to a junction point 33 between the diodes 29 and 30. Accordingly, a selectable voltage may be applied to the screen grid 31.

The tube 28 also has a suppressor grid 33 which is connected to the cathode 34 at a junction point 35. A pair of oppositely connected diodes 36 and 37 are connected between the point 38 and the point 35 at the cathode 34 for providing a breakdown path between the grid 27 and the cathode 34. The diode 36 is a Zener diode. The plate 39 of the tube 28 is connected to the power source at the point 20. The power source at the point 20 is the energy source for the amplifier tube. A heater 40 establishes the operating temperature level of the cathode 34 as is well understood.

The negative supply voltage for the grids of the respective amplifier devices 13 and 28 is provided at a point 41 and is connected to the grid 12 at the tube 13 through a resistor 43 to a junction point 44. The supply of the point 41 is also connected to the grid 27 of the tube 28 through a resistor 45 to the junction point 46. A capacitor 47 keeps sudden voltage rises from interfering with the voltage supply at the point 41.

Similarly, a capacitor 48 keeps sudden voltage rises from interfering with the voltage source at the point 20. A capacitor 49 bypasses the high frequency output signal of the plate 26 from the junction point 50 to the grid 27 of the tube 28 at the point 46. In this way the output signal of the tube 13 can be applied directly to the grid 27 and the output voltage level can also be used as a means for energizing the screen grid 31 of the tube 28.

The final amplification for the pulse train carried through the amplifiers 13 and 28 is accomplished at a power amplifier 51. The amplifier 51 has a cathode 52 and a plate 53 and a control grid 54 connected in the usual manner. The cathode 52 has a heater coil 55 connected to heat the cathode 52 directly in contrast to the indirect heating of the previous amplifier stages as is well understood. The heater circuit associated with the coil 55 has first and second capacitors 56 and 57 as is well understood, which are grounded at the points 58 and 59 and which extend directly from the cathode at points 56*a* and 57*a*.

The pulse modulation train which is received from the grid 12 of the amplifier tube 13 to the cathode 34 of the amplifier tube 28 is received directly at the control grid 54 of the power amplifier device 51. The pulse train consists of various width pulses which reflect the information content of an audio or other information signal.

However, due to stray capacitance between the plate 53 and the cathode 52 of the amplifier device 51 the narrower pulses will be appreciably distorted in comparison to the pulse area required to reflect the instantaneous information signal. Generally the size of the pulse will be increased due to the effect of the stray capacitance. Accordingly, the circuit of FIG. 1 provides a means for reducing the level of the smaller pulses in expectation of their being later increased by the stray capacitance of the amplifier device 51.

The means for reducing the level of smaller pulses consists in part of an amplitude modulating device 60 which is connected directly to the plate circuit 25 of the amplifier 13. The modulation device 60 consists of an inductor 61 and a capacitor 62 connected at a common circuit point 63 and through a resistor 64 to the plate 25. The capacitor 62 is grounded as at the point 65 and the inductor 61 is connected to a power source at the point 66. The power source of the point 66 supplies the amplifier tube 13. A resistor 67 is connected across the inductor 61 to provide the proper modulation level.

Figure 2:
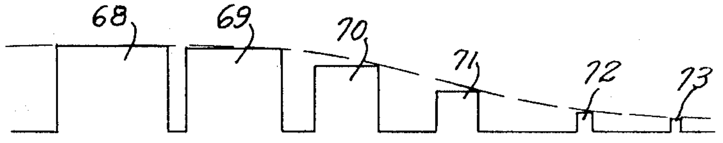
FIG. 2 is a diagrammatic view of a pulse train as amplitude modulated by the compensating means of this invention.

When the pulse modulated train is received at the grid 12 of the amplifier tube 13, and the signal is accordingly amplified at the plate 25 of the tube 13, the modulation circuit consisting of the inductor 61 and the capacitor 62 amplitude modulates the pulse train as shown in FIG. 2.

Essentially, the modulator circuit 60 demodulates the pulse train and applies the resulting signal to the plate 25 for amplitude modulating the pulse modulated signal. The result in FIG. 2 is that the larger pulses 68 and 69, for instance, are amplified considerably more than the smaller pulses 72 and 73. Intermediate pulses 70 and 71 are amplified in accordance with the particular information signal contained therein.

However, since only the smallest pulses are substantially affected by the stray capacitance of the amplifier device 51, a continuous spectrum of amplitude modulation as shown in FIG. 2 is not required to achieve the compensating effects of the circuit. Accordingly, means are provided to assure a substantially uniform level of the larger pulses which are unaffected by the stray capacitance of the amplifier device 51.

Figure 3:
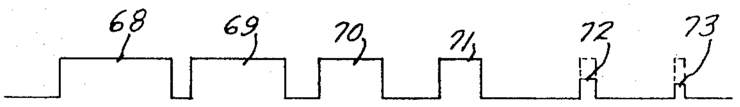
FIG. 3 shows the pulse train of FIG. 2 as would be received at the plate of the final amplification stage if the stray capacitance effects thereof were neglected.

A uniform level for the larger pulses is achieved by selecting the values of amplification, modulation and tube characteristics to be such that the tube 51 will be driven into saturation for all pulses exceeding the minimum value pulse which is affected by the stray capacitance between the plate 53 and the cathode 52. This saturation effect is shown in FIG. 3. Essentially the larger pulses 68, 69, 70 and 71 have been amplitude limited by the saturation of the tube 51. The smaller, narrower pulses 72 and 73, however, have not been so limited and they remain to have a reduced amplitude in comparison to the wider pulses. This reduced amplitude is preselected, as mentioned, such that the stray capacitance of the tube 51 will restore the pulses 72 and 73 to a level which correctly reflects the information signal which those pulses should contain.

Figure 4:
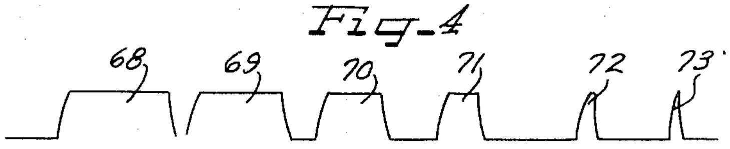
FIG. 4 is a view of the actual pulse train as received at the plate of the final amplification device taking into account the effects of stray capacitance from the plate to cathode of that device.

The final output of the pulse modulator circuit of this invention is shown generally in FIG. 4 wherein the series of pulses 68 through 73 are affected by the stray capacitance of the high powered amplifier device 51 and wherein the smaller pulses 72 and 73 have been restored in area to the area which is required to correctly reflect the information content of the information signal. For example, the dotted lines in FIG. 3 illustrate the size of the smaller pulses 72 and 73 which are required to correctly reflect the information content. However, the pulses 72 and 73 have been shortened to predistort the pulse train or to compensate for the effects known to exist in view of the stray capacitance at the amplifier 51. Accordingly, the pulses as shown in FIG. 4 have an area which correctly reflects the information signal, and the information signal may be recovered by an integrating network, as in the case of a low pass filter, as is well understood.

It will be understood that various modifications and combinations of the features of this invention may be achieved by those versed in the art. However, I desire to claim all such modifications and combinations as properly come within the spirit and scope of my contribution set forth herein.

We claim:

1. A pulse width modulator means comprising:
- a pulse width modulator producing pulses of substantially the same amplitude and with varying widths dependent upon a source of information;
- a first amplifier means receiving the output of the pulse modulator means;
- a high pass filter connected in circuit with the output of the amplifier means so as to reduce the output of the amplifier in the presence of high frequency components;
- a second amplifier coupled to the first amplifier and biased so as to be amplitude-limited when receiving pulses greater than a predetermined width; and
- said second amplifier not amplitude-limited when receiving pulses having widths less than said predetermined width.

2. In a pulse modulator according to claim 1 comprising a third amplifier coupled to the output of the second amplifier and providing an output train of pulses for transmission.

3. An apparatus according to claim 2 wherein said first amplifier means comprises:
- an electron tube having a first electrode which is connected to ground;
- a second control electrode which is connected to the output of the pulse modulator means;
- a third plate electrode which is coupled to said high pass filter;
- the high pass filter having one side connected to ground;
- the second amplifier having a control electrode coupled to the plate of the first amplifier; and
- the third amplifier having a control electrode coupled to the cathode electrode of the second amplifier.

4. An amplitude compensated pulse duration modulator comprising:
- means for pulse duration modulating an information signal;
- first amplifier means for increasing the magnitude of the pulse signals;
- amplitude modulation means for modulating the modulation pulse train in accordance with the information content thereof;
- second amplifier means for further increasing the magnitude of the pulse modulation train;
- said second amplifier means having stray capacitance inherent therein causing distortion of comparatively smaller width pulse signals;
- said amplitude modulation means being chosen to alter the relative magnitudes of the pulse signals to cancel the effects of distortion caused by said second amplifier means;

said second amplifier means being driven into saturation by the comparatively larger pulse signals and being held selectively lower than saturation for comparatively smaller pulse signals whereby the discrepancy in magnitudes of the pulses operating in and out of saturation compensates for the distortion of stray capacitance inherent in said second amplifier means; and said amplitude modulation mean comprises a high pass filter connected in the plate circuit of the first amplifier means.